United States Patent [19]

Goerne et al.

[11] Patent Number: 4,553,249

[45] Date of Patent: Nov. 12, 1985

[54] METHOD AND CIRCUIT ARRANGEMENT FOR CONVERTING A BINARY SIGNAL, ALTERNATING BETWEEN TWO LEVELS, TO A PULSE CODE SIGNAL WHICH COMPRISES DATA PULSES AND RENEWAL PULSES

[75] Inventors: Jan Goerne; Hans-Norbert Toussaint, both of Munich, Fed. Rep. of Germany

[73] Assignee: Siemens Aktiengesellschaft, Berlin & Munich, Fed. Rep. of Germany

[21] Appl. No.: 538,965

[22] Filed: Oct. 4, 1983

[30] Foreign Application Priority Data

Dec. 20, 1982 [DE] Fed. Rep. of Germany ....... 3247120

[51] Int. Cl.[4] .............................................. H03K 5/15
[52] U.S. Cl. ...................... 375/25; 455/608; 360/40
[58] Field of Search .................. 375/25, 121; 455/608, 455/611, 612; 358/260, 261; 360/39, 40, 48, 51; 328/151

[56] References Cited

U.S. PATENT DOCUMENTS

| 3,621,397 | 11/1971 | Murotani | 375/122 |
| 3,873,977 | 3/1975 | McIntosh | 375/25 |
| 4,027,152 | 5/1977 | Brown et al. | 250/199 |
| 4,347,617 | 8/1982 | Murano et al. | 375/37 |
| 4,397,042 | 8/1983 | Tsujii et al. | 435/608 |
| 4,468,789 | 8/1984 | Gromen | 375/122 |
| 4,475,212 | 10/1984 | McLean et al. | 455/608 |

*Primary Examiner*—Robert L. Griffin
*Assistant Examiner*—Stephen Chin
*Attorney, Agent, or Firm*—Hill, Van Santen, Steadman & Simpson

[57] ABSTRACT

With the aid of a delay element and an EXCLUSIVE OR gate, from a binary input signal, upon the occurrence of a level change, an inhibit signal is obtained which blocks a freely-oscillating renewal pulse generator at its output, upon occurrence of level changes in the binary signal, so that the pulse transmission can proceed undisturbed by the renewal pulses through data pulse generators which are activated by the level changes of the binary signal occurring at a tap of the delay element, this is for the purpose of emitting a data pulse which is chronologically offset relative to a level change. The renewal pulses can follow a data pulse, however, at random times within a maximum time interval which is determined by the repetition frequency of the renewal pulses, since no chronological synchronization of the renewal pulses to a preceding data pulse is provided.

7 Claims, 1 Drawing Figure

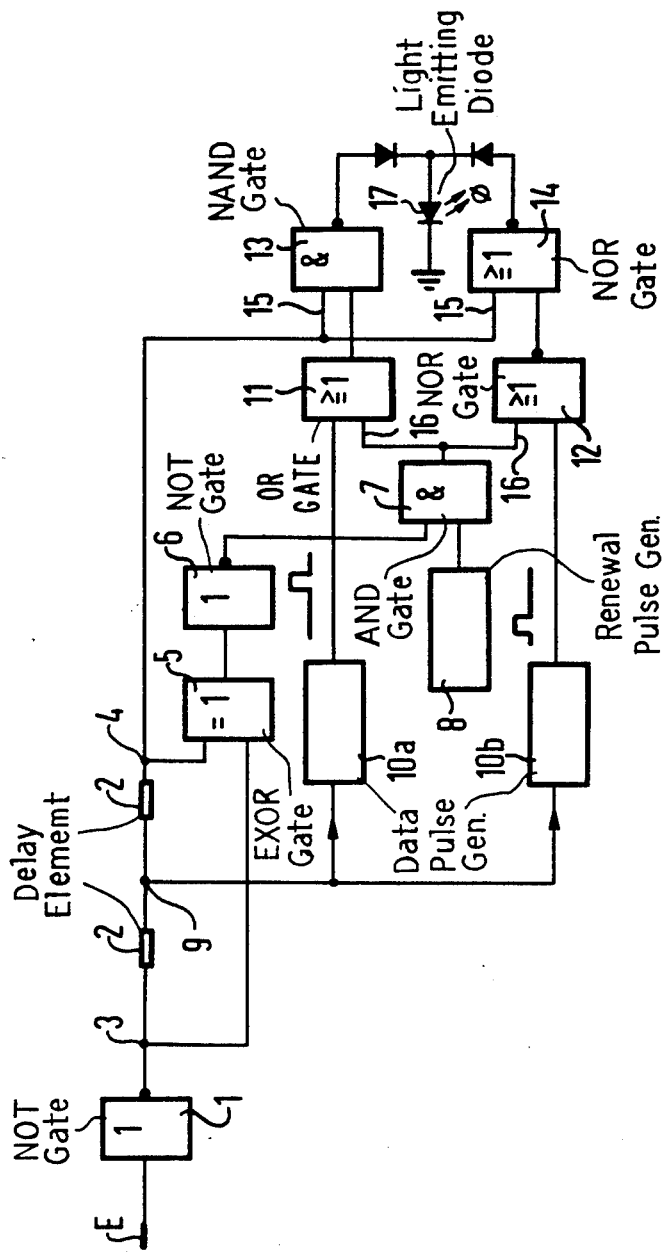

METHOD AND CIRCUIT ARRANGEMENT FOR CONVERTING A BINARY SIGNAL, ALTERNATING BETWEEN TWO LEVELS, TO A PULSE CODE SIGNAL WHICH COMPRISES DATA PULSES AND RENEWAL PULSES

BACKGROUND OF THE INVENTION

1. Field of the Invention

The present invention relates to a method and to a circuit arrangement for the conversion of a binary signal which alternates between first and second levels to a pulse code signal which comprises a data pulse having a first polarity when the binary signal changes from the first to the second level and a data pulse having a second polarity when the binary signal changes from the second to the first level, as well as renewal pulses between two data pulses having the polarity of the last-occurred data pulse, respectively.

2. Description of the Prior Art

A method of the type generally set forth above and a circuit arrangement for carrying out the method is known from the U.S. Pat. No. 4,027,152. A renewal pulse between two data pulses occurs when a specific, defined time interval has elapsed since a first-transmitted data pulse or renewal pulse without a further data pulse having been transmitted. The renewal pulses, in the case of this particular known method, are therefore chronologically-synchronized to a preceding data pulse. If, in the case of this method, or in the case of the circuit arrangement, the generation of a renewal pulse has already been initiated through a time element output signal, and if, at this time, a level change in the binary signal occurs, the result can be an undesired displacement of the leading edge of the data pulse which represents this level change, because the output signal of the time element which monitors the time interval which has elapsed since the transmission of a last-transmitted data pulse or renewal pulse, for the purpose of triggering a renewal pulse, upon activation of one of the two pulse generators employed therein, blocks the respective other pulse generator, and is precisely the latter which is to generate the new data pulse.

SUMMARY OF THE INVENTION

It is accordingly an object of the present invention to provide a method and a circuit arrangement of the type generally set forth above in which interfering coincidences between the occurrence of a renewal pulse and data pulse can be reliably eliminated.

According to the present invention, the solution to this problem results by virtue of the fact that the renewal pulses are generated independently of the level changes of the binary signal with a specific pulse repetition frequency, that the individual data pulses, in relation to the time of occurrence of the level change in the binary signal, respectively, are generated delayed by a time interval, and that, from every level change of the binary signal, a blocking signal beginning with the time point of the level change, is derived for the output locking of a renewal pulse generator for a predetermined interval.

In this manner, a pulse code signal is therefore advantageously formed in which it is guaranteed that, within a maximum time interval since the occurrence of a data pulse, an additional pulse follows which can either again be a data pulse or a renewal pulse. The renewal pulse, however, can occur within the time interval at random times since the generation of the renewal pulses is completely decoupled from the occurrence of the data pulses. In other words, the pulse code signal comprises a train of renewal pulses which is independent of the chronological position of the data pulses. Only the polarity of the renewal pulses is respectively orientated to the last data pulse, i.e. it alternates with the polarity of the data pulses. Given a coincidence of the generation of a renewal pulse and a data pulse, the respective renewal pulse is suppressed in an interference-free manner.

According to a further embodiment of the invention, it is provided that an EXOR gate is connected with a first input thereof to the input and with a second input thereof is connected to the output of a delay element which is subjected to the binary signal, and that the output signal of the EXOR gate is employed as a blocking signal.

Through this design of the circuit arrangement, the inhibit signal for the output locking of the renewal pulse generator is obtained in a particularly elegant manner, whereby the delay effect of the delay element determines the chronological length of the inhibit signal. At the output of the delay element, in particular, the previously-present level of the binary signal is maintained in the case of a level change of the binary signal for so long until the new level of the binary signal appears at the output of the delay element, delayed by the delay interval of the delay element. In the case of a level change of the binary signal occurring at the input of the delay element, unequal levels are present at the input and at the output of the delay element. This unequal state is evaluated by the EXOR gate when the one level is associated with the logic "0" and the other level of the binary signal is associated with the logic "1". For the duration of unequal levels at the input and output of the delay element, the EXOR gate therefore emits an output signal which serves the purpose of the output locking of the renewal pulse generator.

In addition, it can be provided within the framework of the present invention for two pulse generators, provided for the generation of the data pulses to be connected on the input side, with a tap of the delay element.

A chronological delay of the data pulse generation, in relation to the inhibit signal, is hereby effected in a simple manner so that the output locking of the renewal pulse generator proceeds reliably prior to the generation of the data pulse since the EXOR gate transmits the inhibit signal before one of the data pulse generators is activated for the emission of a data pulse.

Finally, it can be further provided that the delay element is fed by way of a negation or inverter element by the binary signal, that the renewal pulse generator, together with the output of the one pulse generator is connected to an OR gate, and, together with the output of the other pulse generator is connected to a NOR gate, and that the output of the delay element with the output of the OR gate is connected to a NAND gate, and with the output of the NOR gate, is connected to an additional NOR gate, and that the NAND gate and the additional NOR gate are control circuits for a radiation-emitting diode.

In this manner, it is advantageously possible to process the data pulses emitted in a chronologically-delayed manner by the data pulse generators with each level change of the binary signal, and to process the renewal pulses emitted by the renewal pulse generator, with the aid of logic elements, together with the respective levels of the binary signal, in such a manner that, with the corresponding level changes, corresponding polarity changes respectively occur in the data pulses and renewal pulses.

BRIEF DESCRIPTION OF THE DRAWING

Other objects, features and advantages of the invention, its organization, construction and operation will be best understood from the following detailed description of a preferred embodiment of the invention, taken in conjunction with the accompanying drawing, on which there is a single smaller figure which is a schematic logic diagram of apparatus constructed in accordance with the present invention.

DESCRIPTION OF THE PREFERRED EMBODIMENTS

Referring to the drawing, an input E of a circuit arrangement constructed in accordance with the present invention receives a binary signal which alternates between two levels. The input E is connected to a NOT gate 1, basically an inverter, so that the signal is fed to an input 3 of a delay element 2. The delay element is provided as two separate delay elements having a central tap 9 and an output 4. At the output 4 of the delay element 2, accordingly, a level change of the binary signal, inverted by the NOT gate 1, occurs only with a chronological delay which is determined by the time delay of the delay element 2. The input 3 and the output 4 of the delay element 2 are connected to respective inputs of an EXOR gate 5. This signifies that, upon occurrence of a level change of the input of the delay element 2, until expiration of the delay time of the delay element 2, the level previously present at the input 3 of the delay element 2 is still maintained.

During the delay time of the delay element 2, accordingly, various levels are connected to the inputs of the EXOR gate 5 upon occurrence of the level change at the input E. If one associates the logic "1" and the logic "0" with the two level states of the binary signal, then the EXOR gate 5, prior to occurrence of a level change at the input 3 of the delay element 2, emits an output signal for the duration of the delay time (the logic "1"). This signal is connected by a NOT gate 6, as a logic "0", to an input of an AND gate 7, which leads to the blockage or inhibiting of the AND gate 7.

A renewal pulse generator 8 is connected to the second input of the AND gate 7. The renewal pulse generator 8 is so designed that it emits, in regular time intervals, a renewal pulse at its output, which renewal pulse represents a logic "1".

The tap 9 of the delay element 2 is connected to respective inputs of data pulse generators 10a and 10b. The data pulse generators 10a and 10b are designed such that, with each level change of the binary signal occurring at the tap 9, they alternately generate a data pulse which is likewise evaluated as a logic "1".

The data pulses generated by the data pulse generators 10a and 10b are fed to an input of an OR gate 11, on the one hand, and an input of a NOR gate 12, on the other hand. Since the output of the AND gate 7, which is connected with additional inputs of the OR gate 11 and the NOR gate 12, exhibits the logic "0", when a level change of the binary signal effects inhibition of the AND gate 7, for the duration of a data pulse the logic "1" is present at the output of the gate 11 and the logic "0" is present at the output of the gate 12.

Both inputs of a NAND gate 13, which is connected to the output 4 of the delay element 2, on the one hand, and with the output of the OR gate 11, on the other hand, therefore exhibits the logic "1" during the data pulse when the input 15 thereof is subjected to the output level of the delay element 2 carries the new, for example, first, level of the inverted binary signal after a change of the binary signal from the first to the second level. Therefore, at the output of the NAND gate 13, during the interval of a data pulse, the logic "0" is present when, at the input 15 of the gate 13, the first level, that is the logic "1", is effective.

A NOR gate 14 includes two inputs, 15 in common with the input 15 of the NAND gate 13 and a further input connected to the output of the NOR gate 12. The inputs of the NOR gate 14, at the same time, i.e. during the generation of a data pulse by the generator 10a, receives a logic "0" from the output of the NOR gate 12 and a logic "1" from the output 4 of the delay element 2. Accordingly, the logic "0" is also present at the output of the NOR gate 14 during the interval of a data pulse of the generator 10a when, at the input 15 of the NOR gate 14, the first level and, hence, the logic level "1" is effected.

Therefore a level change at the input E from the first to the second level effects a transmission of a data pulse by the generator 10a which, during its duration, leads to a disconnection of the radiation transmission by a diode 17.

If, by contrast, a level change from the second to the first level of the binary signal takes place at the input E, then, at the inputs of the NAND gate 13, the logic level "0" coincides with the logic level "0" so that the NAND gate 13 remains effective as a current source for the diode 17. At the inputs of the NOR gate 14, during a data pulse (generator 10b) the logic level "0" (at the input 15) is present and, from the NOR gate 12, during the duration of a data pulse, likewise the logic level "0" is present. The output of the NOR gate 14 is therefore in the state of the logic level "1" so that, therefore, during a change of the binary signal from the second to the first level, a data pulse is generated which is represented for the duration of the data pulse by the state of maximum radiation intensity of the diode 17.

If neither data pulses nor renewal pulses are emitted by the circuit arrangement, then the NAND gate 13 feeds the diode with a medium current so that the latter radiates with mean intensity.

If the state of the second level of the binary signal at the input E lasts for a longer period of time, the first level is effective at the output 4 of the delay element 2 and, hence, at the inputs 15 of the NAND gate 13 and the NOR gate 14, the logic level "1" is present. Pulses emitted by the renewal pulse generator 8, therefore, reach the OR gate 11 by way of the AND gate 7 and reach the NOR gate 12 via the same path, as a logic level "1", or a logic level "0", respectively, and therefore reach the NAND gate 13 and the NOR gate 14.

It therefore results that the circuit arrangement apparent from the drawing emits renewal pulses with the repetition frequency of the renewal pulse generator, which pulses correspond in polarity to the polarity of the last-transmitted data pulse, respectively. If the level change in the binary signal occurs, a data pulse is emitted by the circuit arrangement which respectively possesses a polarity opposite to that of the preceding data pulse. During the transmission of a data pulse, the renewal pulse generator is blocked, so that interfering collisions between the transmission of a renewal pulse and the transmission of a data pulse can be reliably avoided. Although the transmission of a data pulse is chronologically offset by the delay time of the time delay element 2, respectively, relative to a level change of the binary signal, this applies to all data pulses, so that in any case no jitter of the leading edges of the data pulses can occur. Each data pulse specified by the generators 10a, 10b must therefore have such a chronological length that it is still effective at the corresponding inputs of the NAND gate 13 and the NOR gate 14 when the respectively new level at the output 4 occurs, because only during the coincidence time of the generator output signals with the respective new level is a data pulse transmitted through the light emitting diode 17.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of converting a binary signal, alternating between a first level and a second level, into a pulse code signal which includes a data pulse having a first polarity when the binary signal changes from the first level to the second level and having a second polarity when the binary signal changes from the second level to the first level, and renewal pulses between the data pulses and having the same polarity as a last-occurring data pulse, comprising the steps of:

generating the renewal pulses with a renewal pulse generator independently of the level changes of the binary signal and at a predetermined pulse repetition frequency; generating the individual data pulses, in relation to the respective level change of the binary signal and each individual data pulse delayed by a first predetermined time interval; and producing an inhibit signal from each level change of the binary signal and inhibiting the output of the renewal pulse generator with the inhibit signal for a second predetermined time interval beginning at the time of the respective level change.

2. A circuit arrangement for converting a binary signal, alternating between a first level and a second level, into a pulse code signal which includes a data pulse having a first polarity when the binary signal changes from the first level to the second level and having a second polarity when the binary signal changes from the second level to the first level, and renewal pulses between the data pulses and having the same polarity as a last-occurring data pulse, said circuit arrangement comprising:

an input circuit for receiving the binary signal;
delay means connected to said input circuit;
an output circuit including an output device and logic means connected to said output device and to said delay means;
data pulse generating means connected to said delay means and operable to generate the individual data pulses delayed a predetermined time interval, in response to the respective level changes of the binary signal, said data pulse generating means connected to and having the individual data pulses fed to said output device via said logic means;
a renewal pulse generator operable to produce renewal pulses at a predetermined pulse repetition frequency independently of the level changes of the binary signal; and
inhibiting means connecting said renewal pulse generator to said logic means, said inhibiting means comprising a first gate means including a first input connected to said renewal pulse generator, a second input for receiving an inhibit signal and an output connected to said logic means, and second gate means including an output connected to said second input of said first gate means for providing an inhibit signal thereto, a first input connected to said input circuit and a second input connected to said delay means and operable to produce the inhibit signal for a predetermined time interval in response to each level change of the binary signal.

3. The circuit arrangement of claim 2, wherein said input circuit comprises:
an input terminal for receiving the binary signal and a NOT gate including an input connected to said input terminal, and an output connected to said delay means.

4. The circuit arrangement of claim 2, wherein said delay means comprises:
a delay line including an input connected to said input circuit, an output connected to said logic means circuit, and a tap connected to said data pulse generating means.

5. The circuit arrangement of claim 2, wherein said data pulse generating means comprises:
two pulse generators connected between said delay means and said logic means.

6. The circuit arrangement of claim 2, wherein said output circuit comprises:
a light-emitting diode as said output device;
an OR gate and a first NOR gate each including a first input connected to said data pulse generating means, a second input connected to said output of said first gate means of said inhibiting means, and an output;
a NAND gate and a second NOR gate each including a first input connected to said delay means and a second input connected to said outputs of said OR gate and said first NOR gate, respectively, and an output; and
connection means respectively connecting said outputs of said NAND gate and said second NOR gate to said light-emitting diode.

7. The circuit arrangement of claim 6, wherein said connection means comprises: a pair of diodes.

* * * * *